Aug. 18, 1942.  R. A. COFFMAN  2,293,043
POWER GENERATING SYSTEM AND ROTARY BREECH MECHANISM THEREFOR
Filed Nov. 15, 1937  11 Sheets-Sheet 5
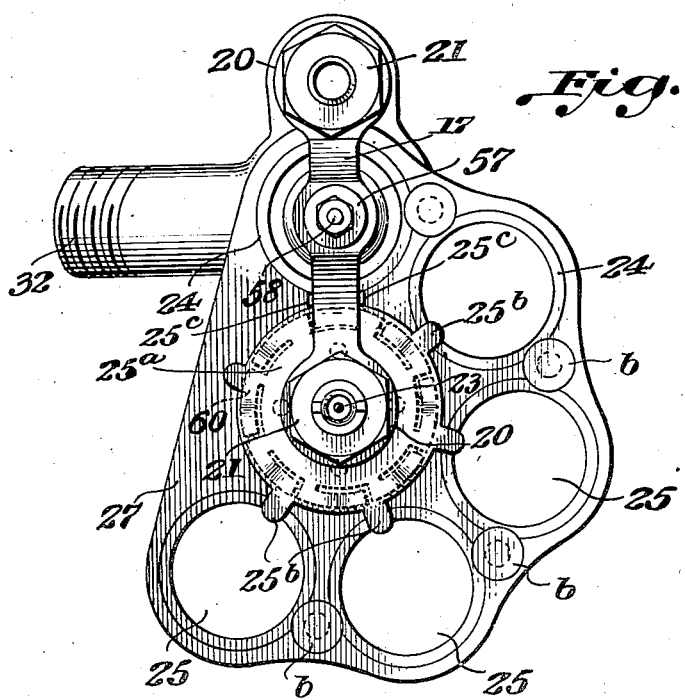
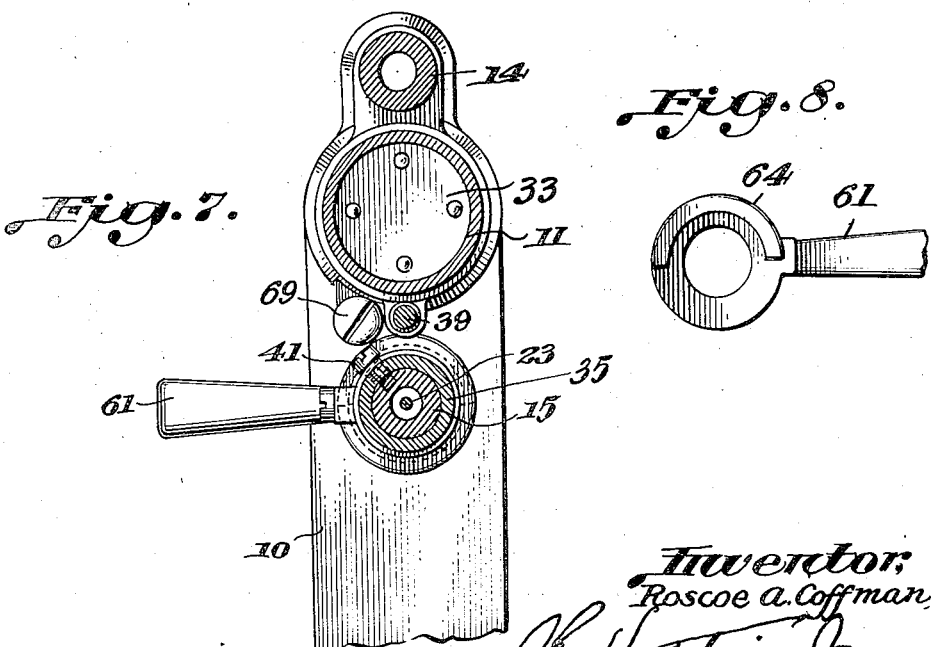
Inventor,
Roscoe A. Coffman
By
atty.

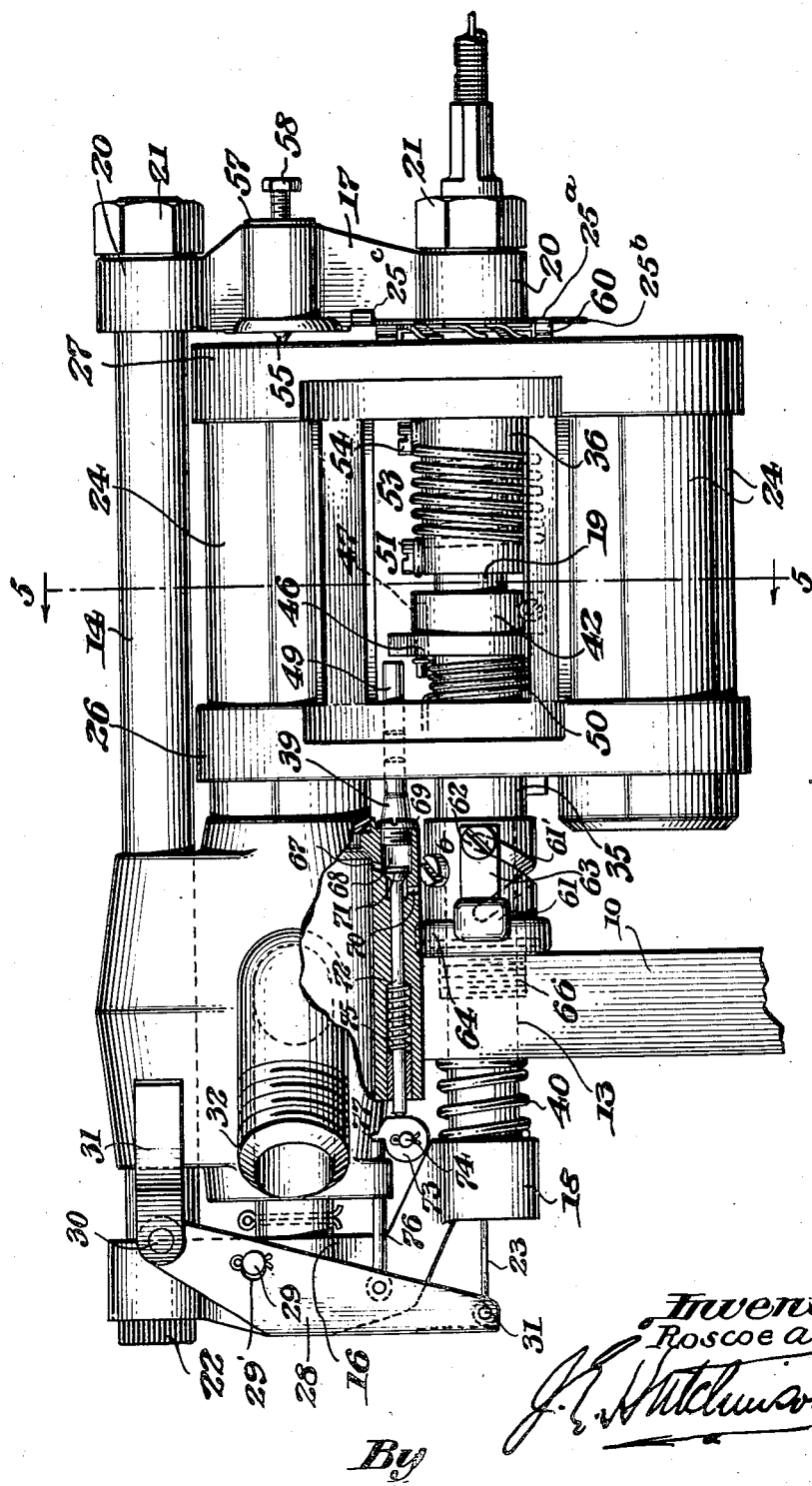

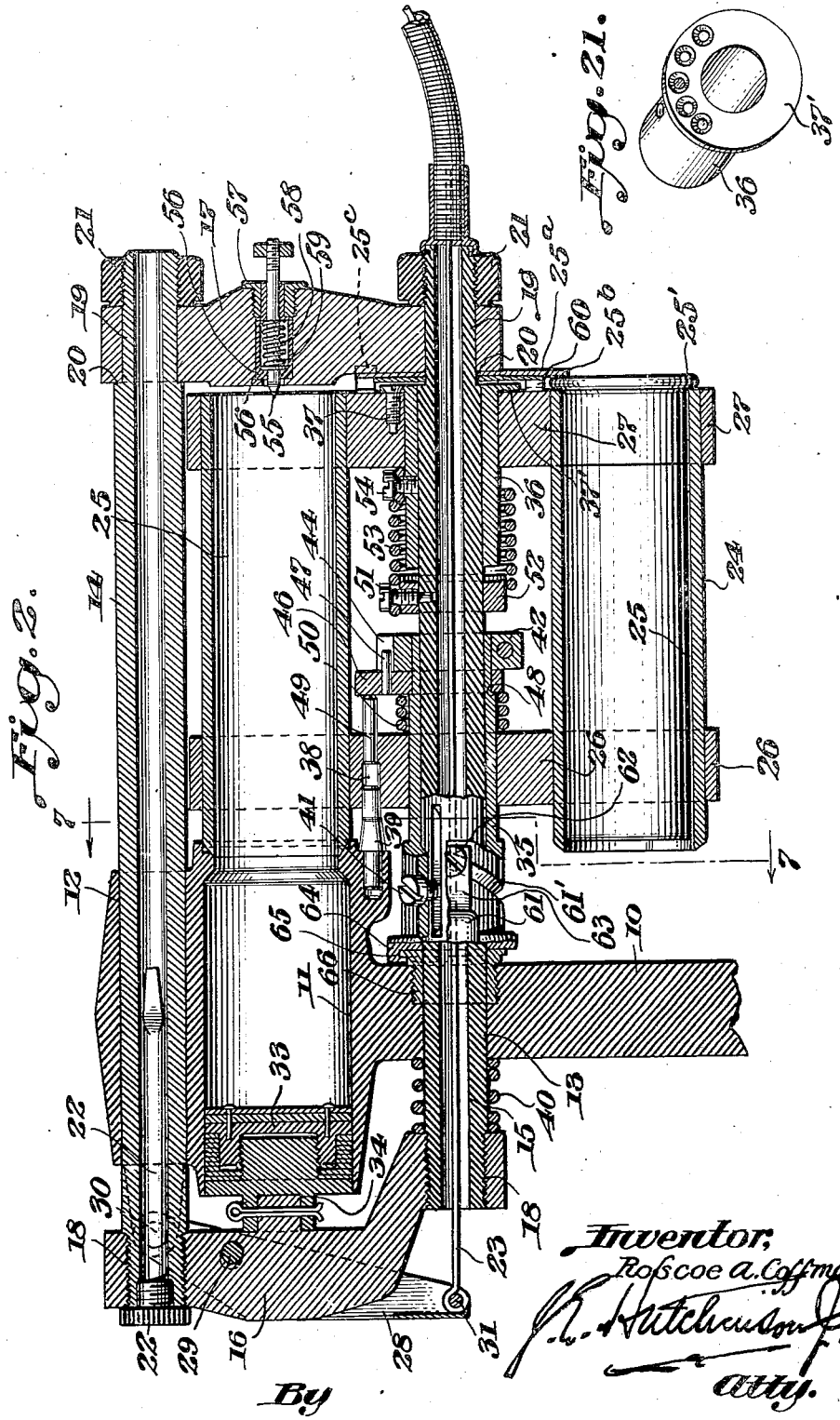

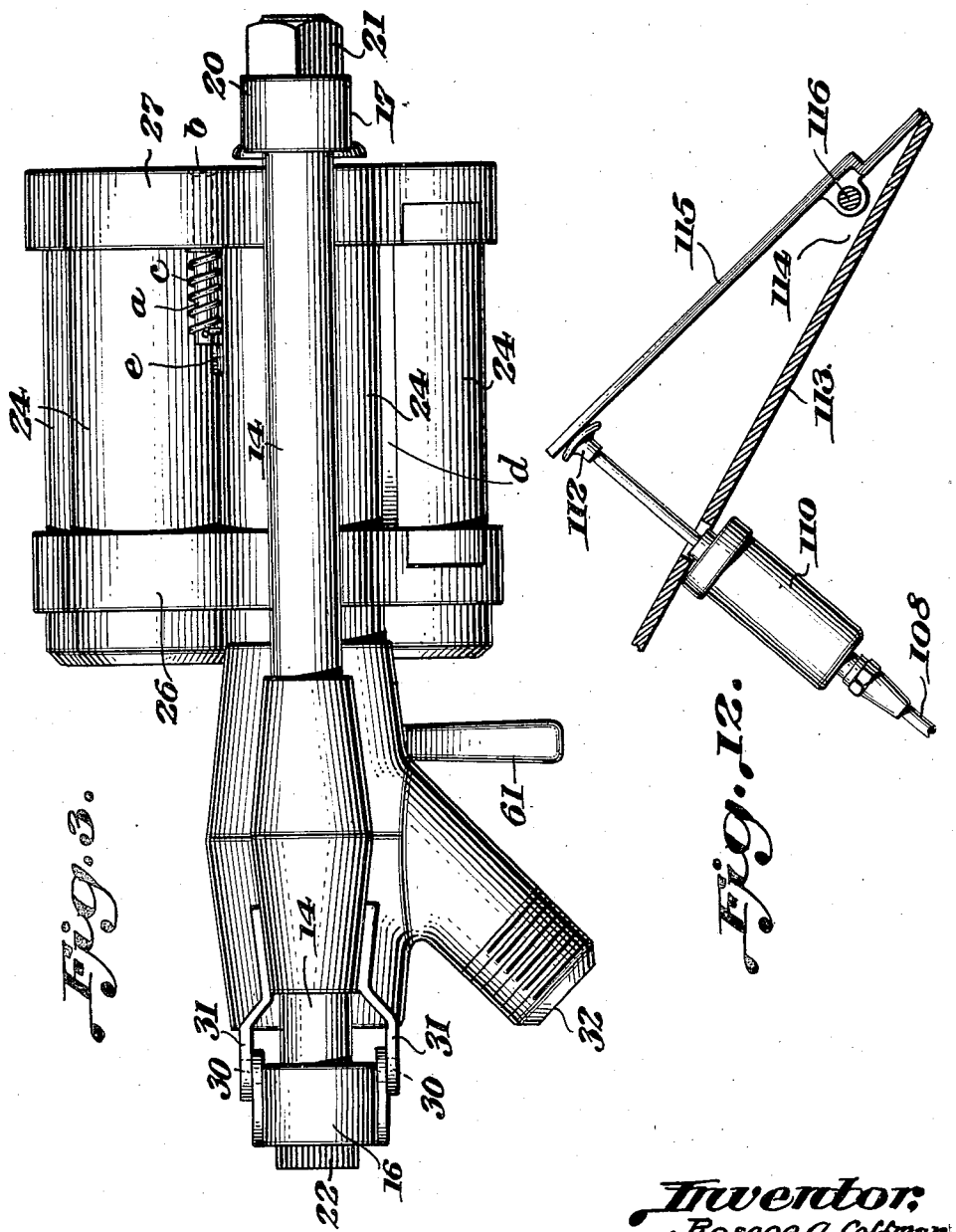

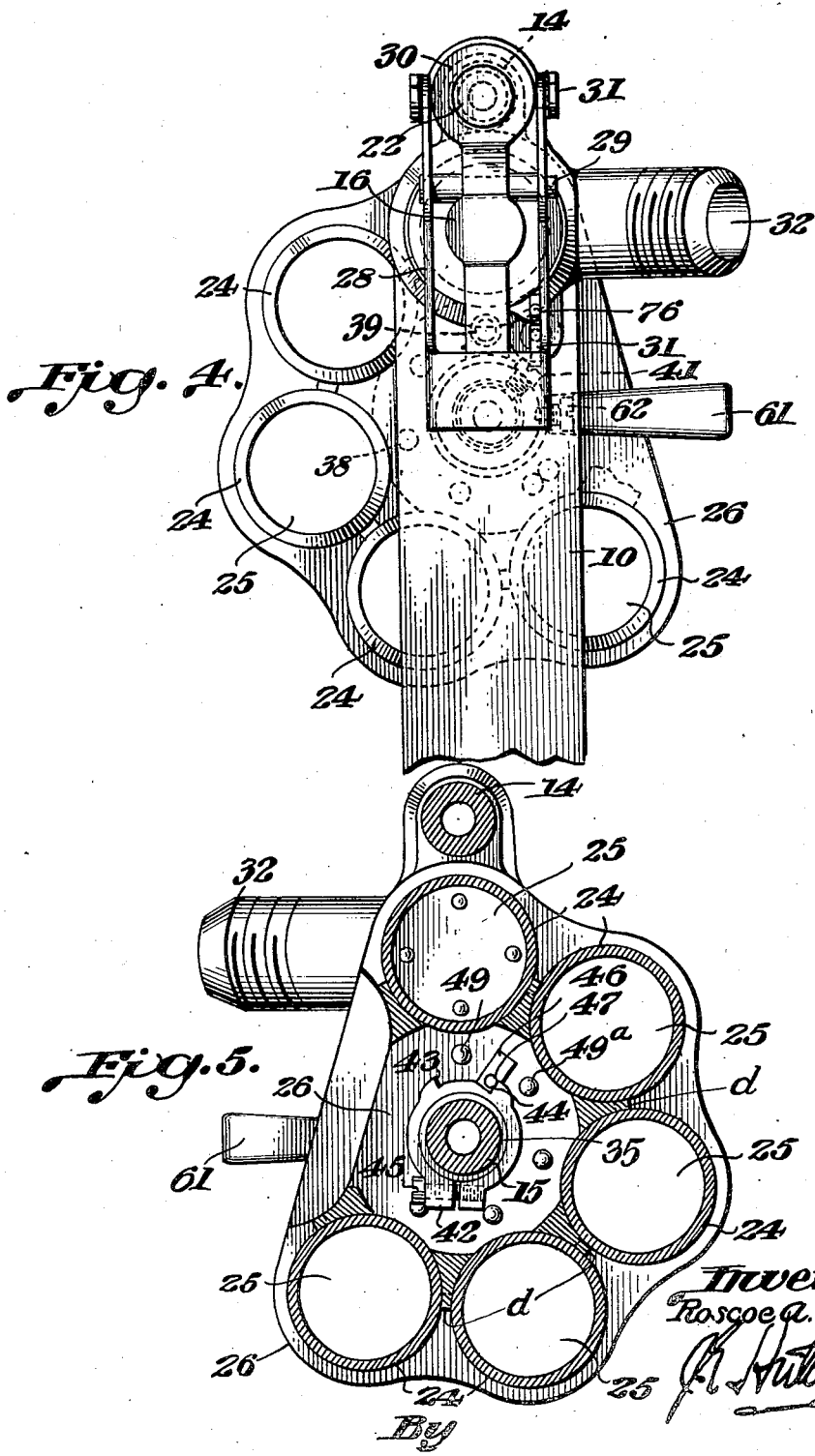

Aug. 18, 1942.   R. A. COFFMAN   2,293,043
POWER GENERATING SYSTEM AND ROTARY BREECH MECHANISM THEREFOR
Filed Nov. 15, 1937   11 Sheets-Sheet 6
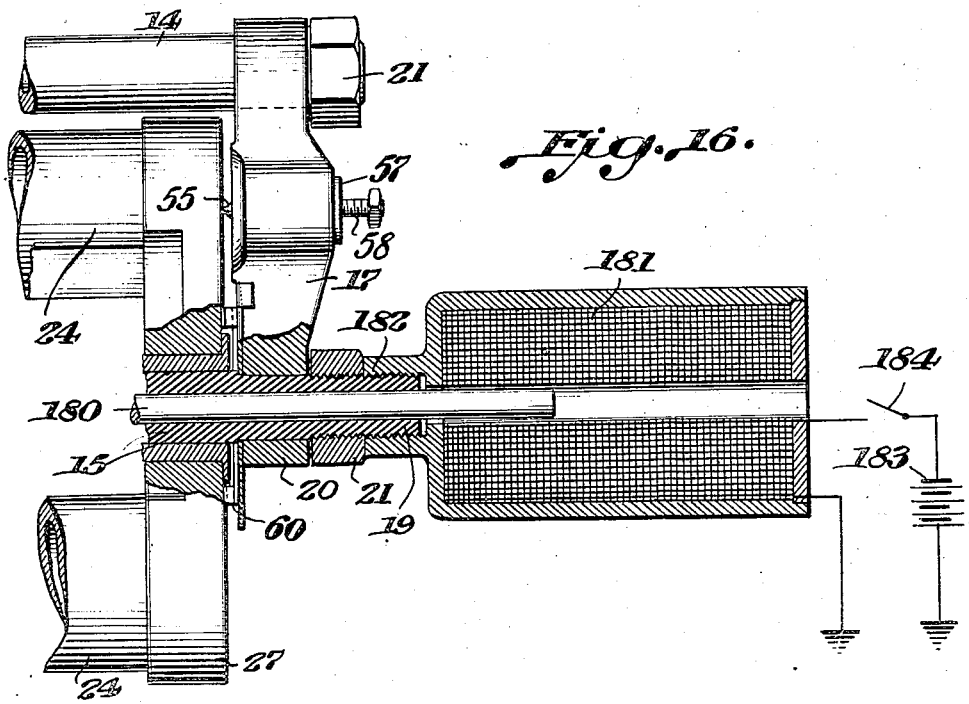
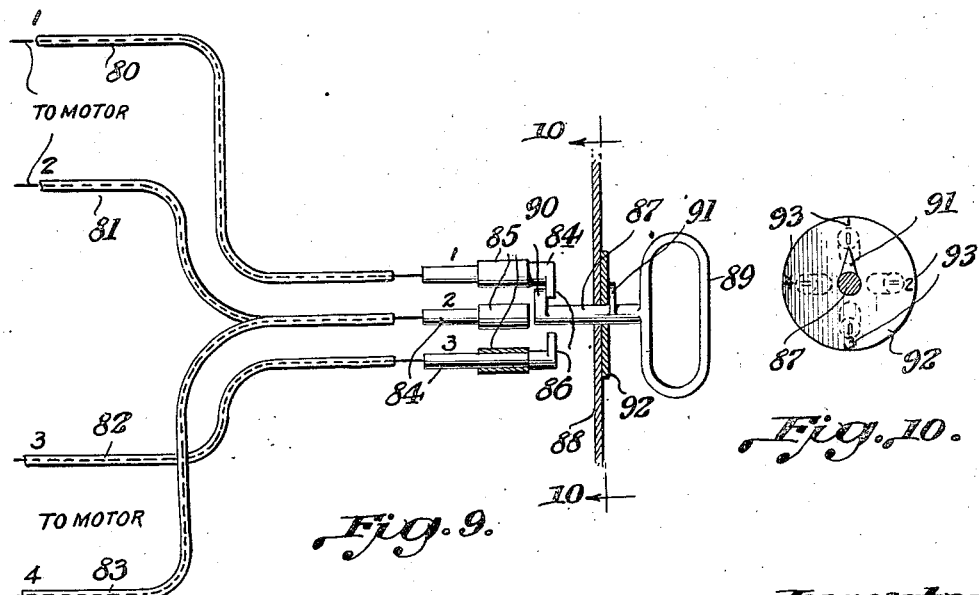
Inventor;
Roscoe A. Coffman
By ...... atty.

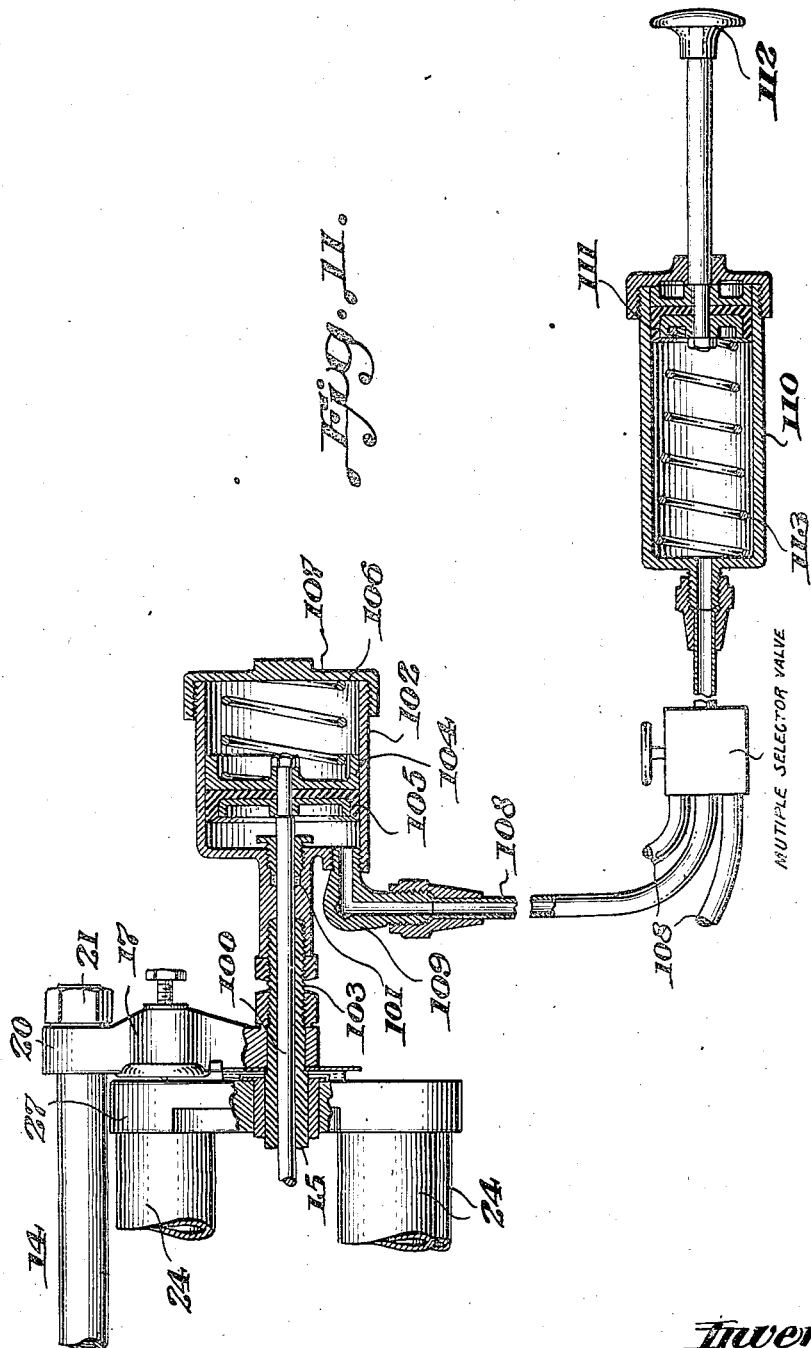

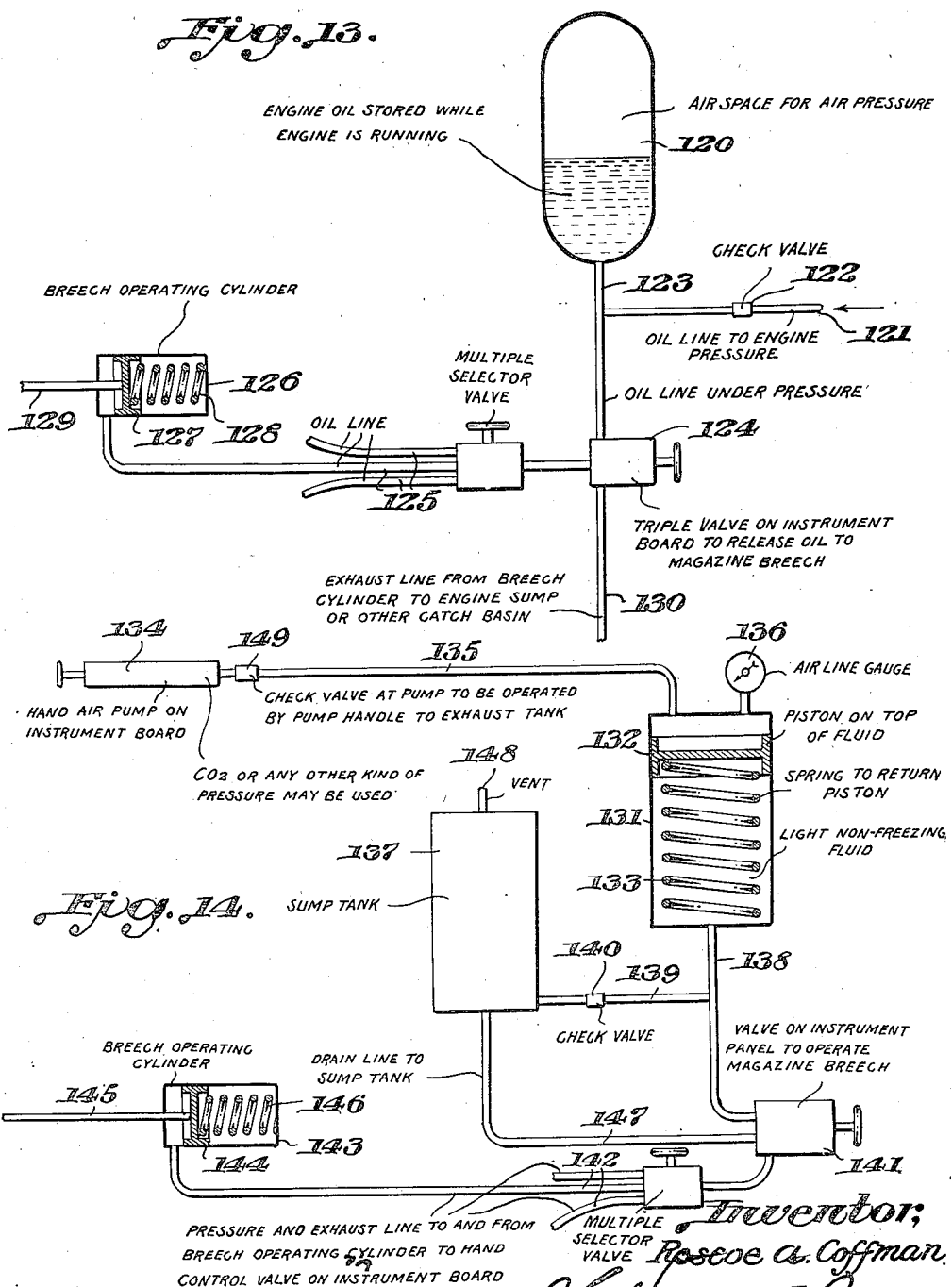

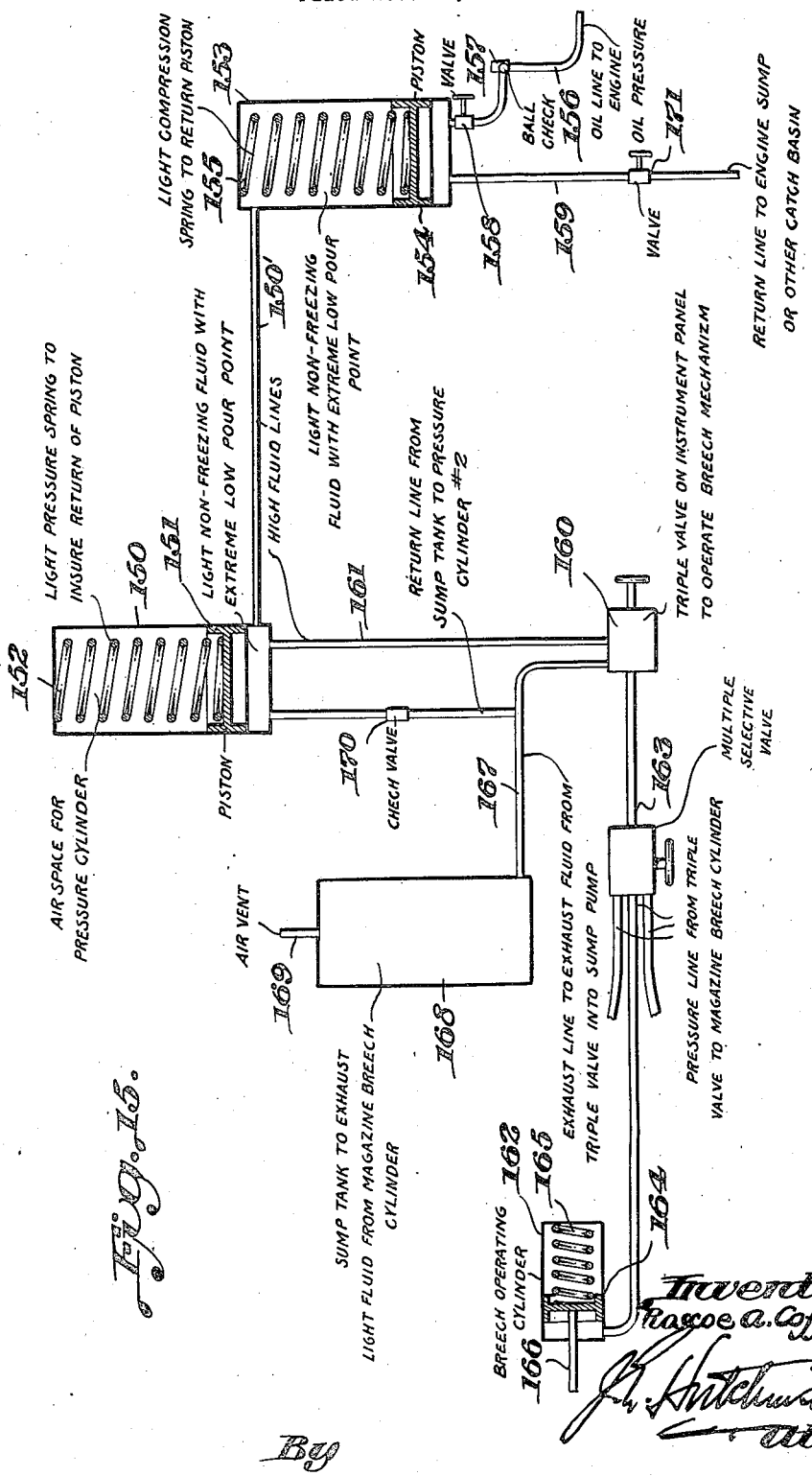

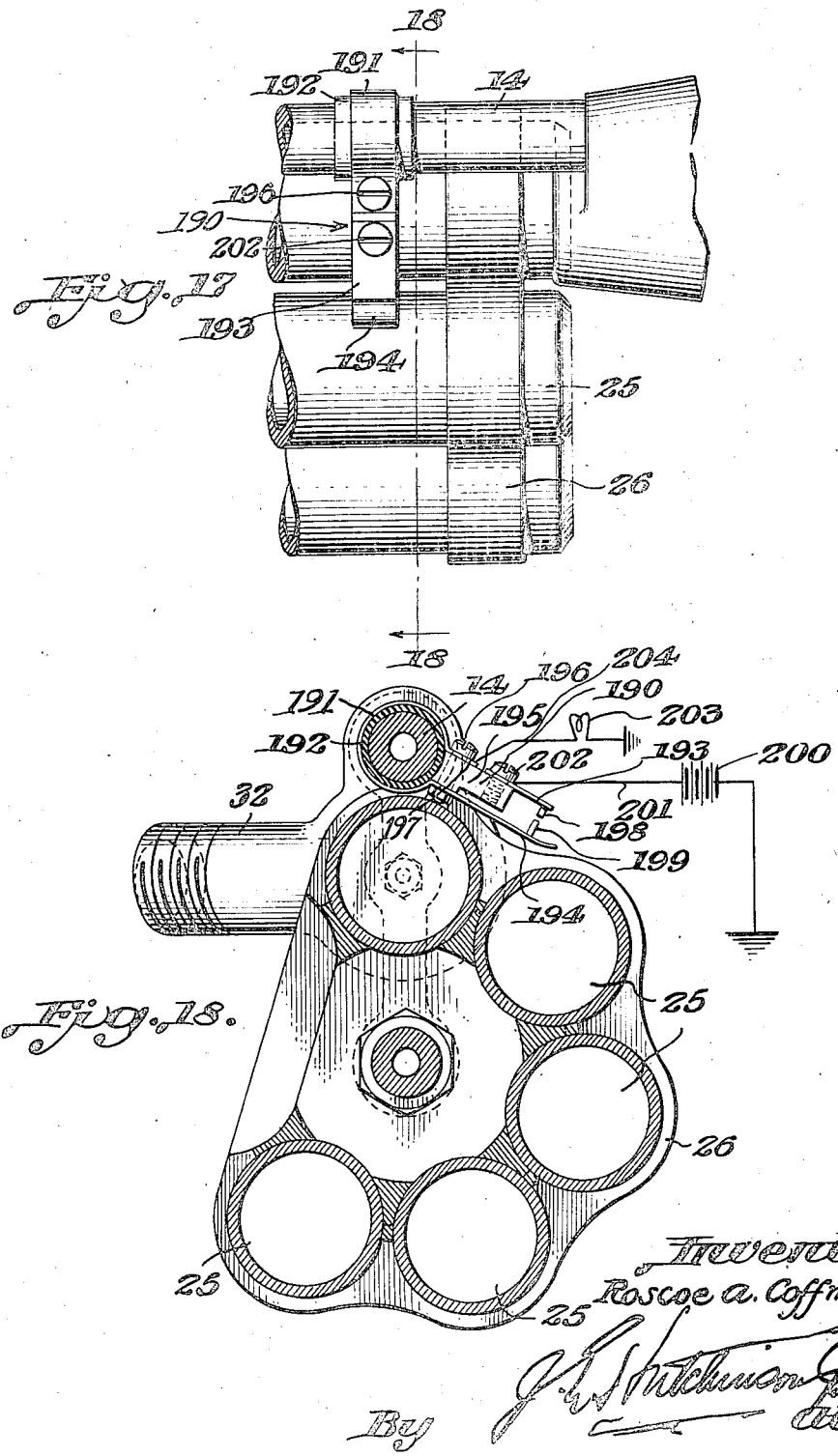

Aug. 18, 1942.    R. A. COFFMAN    2,293,043
POWER GENERATING SYSTEM AND ROTARY BREECH MECHANISM THEREFOR
Filed Nov. 15, 1937    11 Sheets-Sheet 11
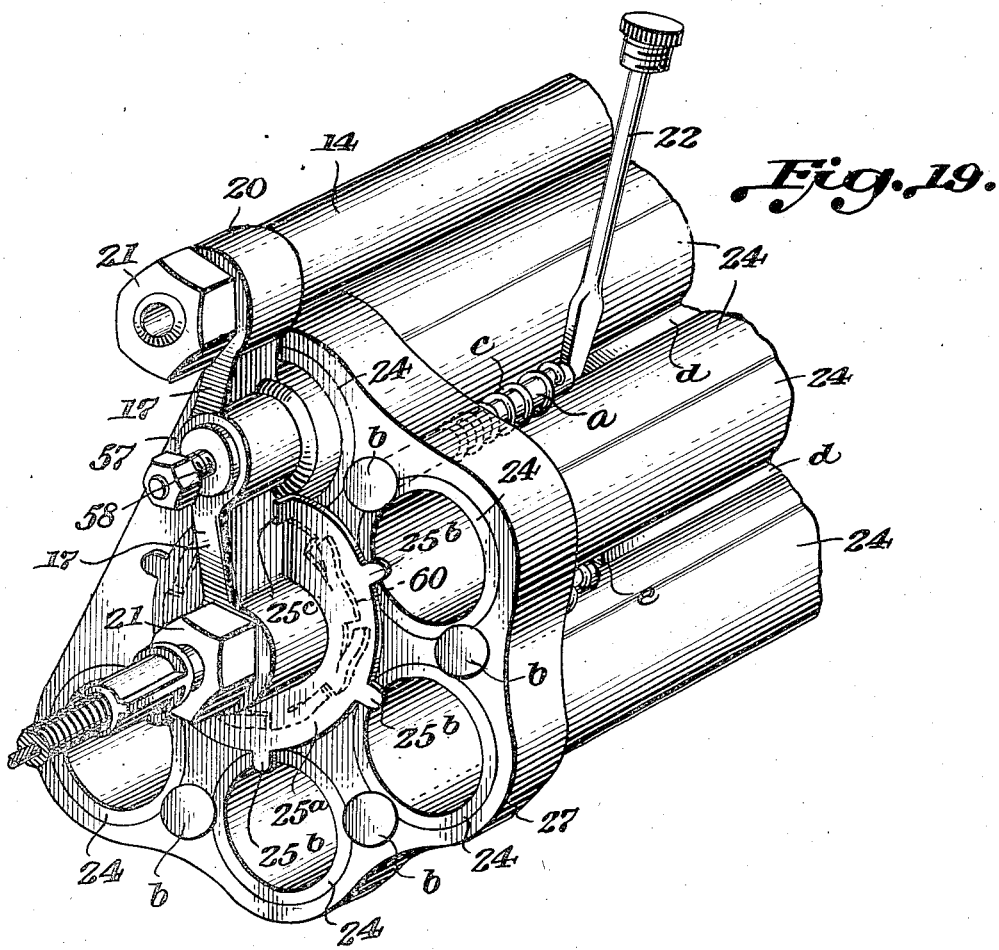
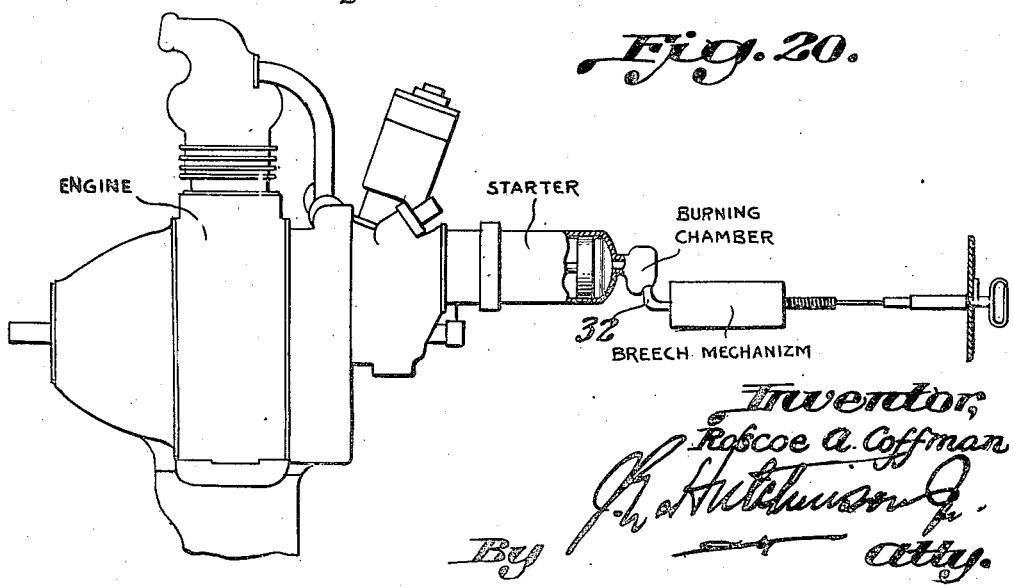

Patented Aug. 18, 1942

2,293,043

UNITED STATES PATENT OFFICE 2,293,043

POWER GENERATING SYSTEM AND ROTARY BREECH MECHANISM THEREFOR

Roscoe A. Coffman, Hollywood, Calif.

Application November 15, 1937, Serial No. 174,727

11 Claims. (Cl. 60—44)

This invention relates to pressure generating mechanism and means for operating the same.

More particularly the invention relates to power generating starting systems for internal combustion engines and the like, and in association therewith to magazine breech mechanisms adapted to set off successively a plurality of pressure generating units of the type shown in my applications Serial Numbers 581,032 and 585,594, the pressure so generated being supplied to a fluid pressure motor of the general type illustrated in my Patent No. 2,005,913.

An important object of this invention is to provide power generating starting systems of the character in question wherein the instantaneous capacity and the heat absorption area of said system under normal conditions are as near uniform for all installations as may be possible, regardless of the position in which it might be found necessary to locate the remote control operating mechanism for said system in any particular power plant installation.

Another object of the invention is the provision of such a power generating starting system which will minimize the necessity of requiring various and sundry types and sizes of power generating units or cartridges to take care of the ever varying conditions and specifications incident to the installing of the system upon any particular engine.

A still further object of the invention is to provide by means of remote control the firing of a power generating unit or cartridge in a system of this character, wherein after firing, and by means of said remote control, the system is initially vented of gases and thereafter by continued operation of the remote control a magazine mechanism is automatically operated to place in firing position in the system a succeeding power generating unit or cartridge for the purposes intended.

A further object of the invention is to provide a device of the type described which will operate without failure and which may be operated from a remote point by means unaffected by widely varying climatic conditions.

It is a further object of the invention to provide such devices which are light in weight and constructed of a minimum of parts all of which are of such simple construction that failure in operation is precluded.

Heretofore, in power generating systems of this general type, the instantaneous capacity and exposed heat absorption area of the system varied in accordance with the character and design of the power plant or engine with which said system was used, and this due to the variable distance the remote control mechanism for operating the system was required to be located from the engine mounting. Therefore it is important and of great advantage to provide a closed system for the purposes intended wherein its instantaneous capacity and heat absorptive area characteristics are substantially uniform, regardless of such variable engine structure installations. With this idea in view, a more complete standardization of parts is possible and, further, a relatively fewer number of different types and sizes of power generating units or cartridges are found necessary for operating the starting systems.

In explanation of the problems involved, it may be stated that in a certain size of "Coffman" cartridge type internal combustion engine starter, used by the United States Army and Navy Air Corps to great advantage at the present time, the installation consists of a power generating system having a predetermined capacity of approximately 15½ cubic inch content, when considering the closed system as comprising the breech, the burning chamber, the tubing or connecting conduit between the breech and the burning chamber, and the cylinder space area of the starter proper. In such a system of the approximate capacity stated, and with a power generating unit or cartridge having a fuel charge of predetermined characteristics sufficient to perform the successful work operation required in such system, repeated successful operations of this system may be considered to be reasonably uniform and the power output can be well regulated by the use of such predetermined power generating unit.

However, with a variation in the engine structure installation, and in a case where additional length of tubing is needed to take care of the location of the breech mechanism in the cockpit of a particular type of airplane where the cockpit location is farther removed from the engine mounting than the length of tubing in the particular set-up just referred to, it becomes desirable in order to compensate for this additional length of tubing (in the event the same power output and operation are desired), to increase the amount of fuel or change the formula of the fuel in the power generating unit. It will thus be seen that in such an instance the capacity of the system has necessarily been increased to meet these installation conditions, and therefore the necessity for another type of power generating unit, which of course is an undesirable factor or requirement as will be obvious, and when considering the question of standardization.

In order to further outline the problems involved and certain difficulties which have heretofore existed in connection with these power generating starting systems, it may be added that should additional length of tubing be necessary to meet the conditions set forth above (when considering, for instance, the standard length and diameter of ⅜ inch inside diameter tubing 30 inches long), it must be remembered that such tubing of this given diameter has a capacity of one cubic inch of open space for approximately each 4 inches of tubing length. Therefore, one foot of such tubing added for any particular installations would add an additional three cubic inches of content to the system in question. Furthermore, with the added length of tubing the instantaneous capacity of the system is not only increased, but the interior wall of each foot of additional tubing length increases the exposed area of metal to the extent of 21.18 square inches of surface, thus permitting increased surface area for the absorption of the B. t. u. which have been generated by the power generating unit and contained in the gases thus derived from the burning of the charge. Of course, it is well known that the more these gases are heated, the more they are expanded, and therefore the more they are expanded the greater the pressure exerted on the part to be moved. Therefore, if these B. t. u. are extracted from the gases during their process of generation and transportation by additional exposed surfaces, this would necessarily not only reduce the temperature of the gases, but would also reduce their degree of expansion, and thus reduce the pressure necessary for the purposes intended. For this reason, it is highly desirable to maintain as small an amount of exposed surface as possible within the system commensurate with the proper and satisfactory operation of said system. Deviations from such a proper alignment proportionately alter the operations.

Furthermore, another reason for standardizing the length of tubing which connects the breeching mechanism with the starting device, and holding the same to proper dimensions, is the fact that it has been found in experimentation that the more this tube is increased in length, the greater the speed of the fuel through the system to the burning or combustion chamber of the starting device, and with this increase of speed of travel of the fuel, it has been observed that the danger is greater of extinguishing the fuel during its passage from the breeching mechanism to the burning chamber. Also, with an increased length of tubing, it is almost invariably installed in such a fashion that a portion of the tubing between the two connecting ends (at the breech and burning chamber respectively) will be at a lower elevation than either of the said ends, and in cold weather operation when the moisture content in the gases is more susceptible to condensation because of contact with cold surfaces, this condensation necessarily settles in the lowest portion of the tubing, whereupon in succeeding operations of the starter the fuel from the power generating unit is carried through or in contact with this condensation and, in some instances, the condensation may be great enough to extinguish the ignited fuel, thus bringing about a hazardous condition in the event all of the fuel is completely extinguished.

Further important objects and advantages of the invention will become apparent as the following description, taken in connection with the accompanying drawings which form a part of this application, proceeds.

In these drawings like reference numerals indicate like parts throughout, and:

Fig. 1 is a view of my improved system and rotary magazine breech mechanism in side elevation, Fig. 2 is a vertical longitudinal section through substantially the center of the pressure mechanism shown in Fig. 2, Fig. 3 is a plan view of the mechanism shown in Fig. 1, Fig. 4 is a front end view of the device, Fig. 5 is a sectional view taken on line 5—5 of Fig. 1, Fig. 6 is a rear end view of the device, Fig. 7 is a sectional view taken on line 7—7 of Fig. 2, Fig. 8 is a detail view of part of the auxiliary operating means used for releasing the magazine for reloading purposes, Fig. 9 is a more or less schematic view of breech operating mechanism adapted for use in connection with a plurality of fluid pressure motors, Fig. 10 is a view taken on line 10—10 of Fig. 9, Fig. 11 is a sectional view of a fluid pressure mechanism for operating the breech mechanism, Fig. 12 shows a manner in which hand operated breech operating mechanism may be adapted to be operated by foot pressure, Fig. 13 is a diagrammatic showing of breech operating means adapted to be operated by oil from the lubricating system of a combustion engine with which the mechanism may be employed, Fig. 14 is a diagrammatic illustration of a modified form of fluid pressure breech actuating mechanism, Fig. 15 is a diagrammatic illustration of a further modification of fluid pressure breech actuating mechanism, Fig. 16 is a view, partially in section, of electromagnetic breech operating mechanism, Fig. 17 is a plan view of electrical contact mechanism in association with my breech mechanism adapted to establish a signal circuit, Fig. 18 is a sectional view of Fig. 17 taken on line 18—18 thereof, Fig. 19 is a perspective view of the rear end of the rotary magazine breech, showing particularly the relationship of the cartridge ejecting means and the cartridge holding fingers with the cartridge chamber and the breech block, Fig. 20 is a diagrammatic showing of the closed starter system in connection with the engine to be started, illustrating particularly the starter proper, the burning chamber, the rotary breech mechanism including the gas and fuel chamber or pressure cylinder (all of which may be of uniform dimensions for variable engine installations), and the remote control means including the Bowden wire operating means, and Fig. 21 is a detail view of the flanged sleeve 36, showing the series of perforations in the sleeve flange for use in adjusting the spring surrounding and attached to said sleeve.

Referring first to the rotary magazine breech mechanism illustrated in Figs. 1 to 8 inclusive, 10 represents a frame member which is adapted to be fixed in proximity to a fluid pressure motor of the type indicated. The frame member 10 has a central bore 11 which serves as a fuel and gas receiving cylinder. At the top of the frame member 10 is an elongated bearing 12 and below the cylinder 11 is a second bearing 13. Bearings 12 and 13 are adapted to mount parallel strain rods 14 and 15 respectively. The strain rods 14 and 15 are rigidly interconnected at the front end by a block 16 and at the rear end by a breech block 17. The strain rods 14 and 15 may be screw threaded at their front ends to engage internal screw threads on the block 16 as generally indicated at 18. The rear ends of the strain rods 14 and 15 are provided with reduced portions 19 forming a shoulder 20 against which the inner surface of the breech block 17 rests and against which the breech block 17 is pressed by means of nuts 21 which are threaded on the inner ends of the strain rods 14 and 15.

The strain rods 14 and 15 are in the form of tubes or cylinders. The front end of the strain rod 14 may be closed by means of a tool 22, which tool is adapted to be received within the bore of said strain rod 14, while the bore of the strain rod 15 is adapted to accommodate a Bowden wire 23, the purpose of which will hereinafter be explained.

A cartridge magazine 24 is mounted for rotary movement on the strain rod 15 and this magazine is composed of a plurality of cartridge chambers 25 which are mounted in evenly spaced relation in spacing plates 26 and 27. The cartridges when loaded into these chambers 25 are held in proper relation therein and from accidental removal therefrom (which might occur from jarring vibrations) by means of a spider washer 25ª mounted upon the reduced portion 19 of the strain rod 15 between the breech block 17 and the spring washer 60, the fingers or legs 25ᵇ of said spider washer extending radially therefrom and a single finger or leg in each instance overlapping the rear end of each cartridge for a short distance for the purpose intended and as clearly illustrated in Figs. 2 and 6 of the drawings. In order to retain the spider washer 25ª in a relatively fixed relation upon its mounting and to hold the fingers or legs in proper relation with the cartridges, outwardly bent lugs 25ᶜ are provided on one of the radial fingers or legs, which lugs engage the side edges of the breech block 17 as clearly shown in Fig. 6, the breech block being positioned between the two lugs in question and thus preventing any rotative movement of the spider washer and its fingers or legs as will be obvious.

The strain rods 14 and 15 are adapted for limited reciprocating movement in bearings 12 and 13 respectively. A pair of links 28 is pivoted on the lugs 29 projecting laterally from each side of the connecting block 16, and it is to be noted that each link 28 is slotted as at 29' to form a lost motion pivotal connection between these links and the lugs 29 for a purpose to be hereinafter set forth. One end of the links swings about a fixed pivot 30 which is formed on lugs 31 carried by the frame member 10 near the top thereof. The lower end of the links 28 is connected with the Bowden wire 23 as indicated at 31. The cylinder 11 is provided with a pressure outlet 32, which is connected with the inlet to the burning chamber of the fluid pressure motor to be operated, and is sealed at its outer end by a piston 33 which is attached to a lug 34 projecting inwardly from the connecting block 16. This arrangement permits endwise movement of the strain rods and enables an operator to manipulate the Bowden wire 23 in a manner to pull the interconnected strain rods and associated mechanism rearwardly in a manner that will cause the magazine 24 to operate as to be hereinafter more fully described.

The magazine 24 is mounted for rotary movement on a sleeve 35 which is slidably carried by the strain rod 15 and adapted to move in a longitudinal direction with respect thereto, although rotary movement of the sleeve with respect to strain rod 15 is prevented due to the pin and slot connection shown at 41. It will be seen that the spacing plate 26 has no connection with the sleeve 35 but is simply in close contact therewith whereby the sleeve 35 forms a bearing for the spacing plate 26. The spacing plate 27 is connected to a sleeve 36 which is carried by and adapted to rotate on the strain rod 15. The connection between the spacing plate 27 and the sleeve 36 may be effected in any suitable manner as by a screw 37, which in the particular instance shown passes through any one of a series of perforations located in the flange 37' at the rear end of said sleeve and enters a screw bore in the spacing plate 27 as clearly shown in Fig. 2. The series of perforations in the sleeve flange 37' is provided for a purpose to be hereinafter set forth.

The spacing plate 26 is provided on the front face thereof with a plurality of apertures 38. These apertures are formed on the radial center line of each of the cartridge chambers 25. Carried by the frame member 10 is a locking pin 39 which is adapted to engage the apertures 38 successively and latch the several cartridge chambers 25 in alignment with the cylinder 11.

The strain rods 14 and 15 are normally held in breech closing or forward position by means of the spring 40. Rearward movement of the breech block 17 and of the rotary magazine 24 to permit disengagement of the relatively movable elements and the rotation of the magazine is effected by exerting a pull on the Bowden wire 23. When the Bowden wire 23 is operated the strain rods 14 and 15 will be moved rearwardly against the tension of the spring 40 by virtue of the hereinabove described pivoted connection of the links 28. When the rods 14 and 15 are moved rearwardly against the tension of the spring 40 by the Bowden wire mechanism, it is to be noted that the strain rod 15 will move longitudinally with respect to the sleeve 35, said sleeve remaining in a fixed position but permitting such relative movement due to the pin and slot connection 41 referred to above. At the rear end of the sleeve 35 is a notched collar 42 which has formed thereon shoulders 43 and 44. This collar is clamped to the reduced end of the sleeve 35 by means of a clamping bolt 45. Immediately to the front of the collar 42 is a segment 46 which is rotatably carried on the reduced end of the sleeve 35. The segment 46 is free to rotate on the sleeve 35 and its rotation with respect to this sleeve is limited only by the shoulders 43 and 44 on the collar 42. This limited movement is effected by means of a pin 47 which projects from the rear face of the segment 46 and into the path of the shoulders 43 and 44 defining the notch in the collar 42. Longitudinal movement of the segment is prevented by the notched collar 42 on the one side and the shoulder 48 which is formed on the sleeve 35 on the other side.

The spacing plate 26 carries a plurality of pins 49 on its rear face. These pins are positioned in the same radial lines as the apertures 38 on the front face of the spacing plate 26. One pin 49 is provided for each chamber 25. The length of the pins 49 is such that they are normally in a vertical plane to the rear of the segment 46. They, however, serve the purpose of limiting the rotary movement of the magazine as will hereinafter be more fully described. A spring 50 surrounds the sleeve 35 and is suitably secured at one end thereof to the magazine structure, the other end of said spring being attached to the segment 46 in a manner to urge the segment in clockwise direction.

Attached to the strain rod 15 by means of a screw 51 is a collar 52. The rear surface of the collar 52 is spaced from the sleeve 36 to provide a sufficient amount of relative axial movement therebetween. The screw 51 may also serve to mount one end of a coil spring 53 against the collar 52. The other end of the spring 53 is fixed to the sleeve 36 by means of a screw 54. The spring 53 is under torsional tension so that it serves to rotate the magazine 24 when the same has been freed from its associated latching pin 39, and this tension may be adjusted, if found necessary, by rotating the sleeve and having the screw 37 engage within the desired perforation in the sleeve flange 37', as will be readily understood.

The breech block 17 carries means for setting off a charge unit in any one of the several chambers 25 which may be in alignment with the cylinder 11. Such means may comprise an electric firing pin 55 to the outer end of which circuit wires may be attached. The firing pin 55 is preferably mounted in a sleeve of insulating material 56 and this sleeve may be fixed in the breech block 17 by means of a threaded nut 57. The firing pin 55 is adapted to yieldably engage the charge within the chamber 25 by virtue of the spring 58 which at one end is in contact with the insulating sleeve and at the other end contacts a shoulder 59 on the pin 55.

Assuming each of the several chambers 25 of the magazine 24 to be loaded with a pressure generating charge, as seen for instance at 25' in Fig. 2, and assuming the magazine to be in the position shown in Figs. 5 and 6 wherein the first chamber 25 is in registration with the cylinder 11 and the firing pin 55, the following is to be noted when considering the arrangement of parts as referred to above. Under such conditions the spring 53 is under sufficient tension to rotate the magazine 24 in a counter-clockwise direction to bring the next succeeding chamber 25 thereof to firing position if and when the latching mechanism including pin 39 is released. The operation of the mechanism is, however, such as to permit the magazine 24 to rotate only the distance from the medial line of one chamber to the medial line of the next succeeding chamber. This operation may now be described.

The charge in the first chamber having been ignited and used to perform its work operation in the system, the next succeeding chamber 25 is to be brought into firing position. To accomplish this, the operator will exert a rearward pull on the Bowden wire 23. This will swing the lower end of the links 28 rearwardly about the pivots 30. As a consequence of this, the links 28 will move upon their pivots 30 a short distance (due to the lost motion connection 29—29' between said links and the block 16) to first move the valve operating rod 76 and its associated valve mechanism for exhausting the cylinder 11, to be more fully described hereinafter, and then said links 28 will bear rearwardly against the laterally projecting lugs 29 on the block 16, and through this block 16 force the strain rods 14 and 15 rearwardly against the tension of the spring 40. This initial movement is effective to carry the breech block 17 out of contact with the chamber 25, and this movement is assisted by the spring member 60. The initial rearward movement of the strain rods 14 and 15 does not, however, effect any movement of the magazine 24, and this due to the spaced relation between the collar 52 and the end of the sleeve 36. Continued movement of the rods 14 and 15 will effect contact between the collar 52 and the sleeve 36, and it is not until the collar 52 is carried into contact with the sleeve 36 that the sleeve 36 begins its rearward axial movement to bring about movement of the magazine in a rearward direction to permit operation thereof. As soon as the sleeve 36 begins to move rearwardly the magazine 24 will likewise be moved rearwardly with respect to the sleeve 35 and follows along with the sleeve 36 and the strain rod 15 because of the unitary construction of the sleeve 36 and the magazine 24.

As the magazine 24 is moved rearwardly, one of the pins 49 will be brought into the vertical plane of the segment 46. It will be noted that the pin 47 carried by the segment 46 is normally in contact with the shoulder 44 (see Fig. 5) of the collar 42 so that the pin 49a will lie to the clockwise side of the segment 46. As soon as the magazine 24 is moved rearwardly a sufficient distance to free the connection between the frame 10 and the magazine 24 which is formed by the pin 39 engaging within one of the apertures 38, the spring 53 will rotate the magazine 24 in a counter-clockwise direction. This rotation is limited by contact established between the pin 49a, the segment 46, the pin 47, and the shoulder 43 on the collar 42. It will be observed, of course, that the collar 41 is fixed against rotation and that the shoulder 43 thereof forms a positive stop. Thus, the rotation of the magazine is limited to an angular distance measured by the centers of two adjacent cylinders 25. After rotation of the magazine has taken place the Bowden wire is released and the spring 40 again returns the members to firing position. In this position the magazine 24 is again latched against further rotation by the pin 39 engaging within the next succeeding aperture on the front face of the spacing plate 26, the segment 46 is free to move in a clockwise direction past the pin 49 back to its normal position and under the influence of spring 50, the front end of the chamber 25 contacts the rear end with the cylinder 11, the breech block 17 now closes the rear end of the chamber 25, and the mechanism is again in condition for setting off a charge of fluid pressure generating material for the performance of useful work.

It will be noted that the arrangement of the piston 33 in the cylinder 11 insures against premature movement of the breech block 17. Pressure in the cylinder 11 will bear against the piston 33 and through its connection with the interconnected strain rods 14 and 15, will serve to hold the breech block 17 in tight contact with the rear end of any one of the chambers 25 with which it may then be associated, it being of course understood that in order to accomplish this end the exposed surface area of the piston which is subjected to pressure is greater than the exposed surface area of the cartridge within the chamber 25.

At 61 is shown a handle which primarily constitutes a manual operating means adjacent the breech mechanism for use in connection with the reloading of the magazine with power generating units or cartridges. It will be noted that the sleeve 35 is provided with a spiral groove 61' into which extends the end of a screw or stud 62 which is carried by a plate 63 which extends rearwardly from the handle 61 and which overlies the sleeve 35. This mechanism is mounted for rotation on the sleeve 35 by a narrow portion thereof which extends around the sleeve 35 which forms its bearing. Endwise movement of the manually operated mechanism is prevented, but rotary movement thereof is permitted by the grooved collar 64 which extends over a lip 65 on the bushing 66 carried by the frame 10. Consequently, angular movement of the handle 61 would normally tend to rotate the sleeve 35 but since the sleeve 35 is splined to the strain rod 15 by means of the pin and slot arrangement 41, such rotary movement is prohibited and at the same time converted into axial movement of the sleeve 35. Upon such axial movement of the sleeve 35, the rear end thereof will contact the collar 52 to move the strain rod 15 in a rearward direction to permit the breech block to move away from the magazine structure, and by further axial movement of said sleeve 35 in the same direction, the collar 52 on the strain rod 15 will contact the forward end of sleeve 36 and move the magazine rearwardly to release it from its associated parts as heretofore set forth, while at the same time maintaining the magazine and the breech block in the spaced relation previously assumed, thus permitting the magazine to be free for the rotative movement necessary to reload the magazine with cartridges and the resetting of the parts of the entire structure to permit the various mechanisms to again function in the manner heretofore described in detail.

It will therefore be seen from what has been set forth above, that mechanism has been provided whereby the breech magazine may not only be operated by remote control (Bowden wire mechanism for instance), but provision is also made for operating the magazine at a point closely adjacent the magazine mechanism, and this for the purpose of moving the several parts and mechanisms to such positions as may be necessary to permit ready, easy, and accurate reloading of said magazine. However, prior to reloading it is necessary to eject the shells of the series of cartridges which have been fired, and for this purpose is provided a plurality of pins *a* having ejector heads *b* which in normal position lie flush with the outer face of the spacing plate 27, which heads, when the cartridges are in loaded position within the magazine, lie partially beneath the rim of the cartridge shells, and thus are in a position to engage said shells and eject the same from their chambers 25 when the ejector pins are moved outwardly against the tension of springs *c* provided for normally holding said pins in the position shown in the drawings. It is to be noted that a single pin and its ejector head serve to eject two adjacent cartridge shells, the ejector head in each instance lying beneath the rims of two adjacent shells, as will be clearly understood from an inspection of Fig. 6 of the drawings. Furthermore the spacing ribs *d* between adjacent cartridge chambers of the magazine 24 are provided with a notch *e* in their outer edges, which notch *e* in each instance lies in a position directly adjacent the inner end of an ejector pin, thus permitting a screw driver or other tool 22 to be engaged within each notch to provide means for permitting an end of said tool to be retained relatively fixed while moving said tool with a wedging action against the end of the ejector pin for moving the same in an outward direction for ejecting the used cartridge shells in a manner as set forth above.

It is to be understood that the fingers or legs $25^b$ of the spider washer $25^a$ are of such dimensions as to not interfere in any way with the ejector pins, and that when it is desired to eject the cartridge shells in the manner herein described, the magazine may be rotated and manipulated to a position where the fingers or legs lie against or adjacent the spacing plate 27 and at points between the cartridge chambers, thus making provision for ready and easy ejection of the cartridge shells and without interference in any way insofar as the cartridge retaining fingers or legs are concerned.

Means has been provided for venting the cylinder after each operation of the mechanism and this means comprises a vent passage 67 which leads into a valve chamber 68. The valve chamber 68 is closed at one end by a screw closure 69 and has leading therefrom a passage 70 to the atmosphere. Communication between the cylinder 11 and the atmosphere through vent passages 67 and 70 is normally closed by a valve 71. A valve stem 72 extends through a bore in the frame member 10 and the end thereof extends beyond the face of the frame member 10 and into the path of an operating cam 73 which is pivoted at 74. The valve 71 is retained in seated position by means of a spring 75. One of the links 28 has pivoted thereto a valve operating rod 76 which is journalled for sliding movement in the frame member 10. The operating rod 76 is adapted to contact a projection 77 on the cam plate 73. With this construction, it will be evident, the valve 71 will be moved rearwardly to establish communication between the ports 67 and 70 upon the initial movement of the links 28 upon their pivots 30, this operation being permitted and brought about due to the lost motion connection 29—29' heretofore described, it of course being necessary to exhaust or vent the cylinder 11 prior to the rearward movement of the strain rods 14 and 15 for the purpose of actuating the magazine mechanism for bringing the next succeeding cartridge in position for firing. Upon such rearward movement the operating rod 76 will contact the projection 77 on the cam plate 73, moving the same rearward so that the cam surface in contact with the projecting end of the valve stem 72 will move the stem 72 rearwardly against the tension of the spring 75. Upon return movement of the parts to firing position the spring 75 will return the valve 71 to its seat and close communication between the cylinder 11 and the atmosphere.

It is evident that the Bowden wire attached to the mechanism for the purpose of operating the same may extend to a remote point where it is accessible to an operator, such as to the cockpit of an airplane. In its simplest arrangement the end of the wire may have an operating handle attached thereto. In Figs. 9 to 16 of the drawings is disclosed a number of operating mechanisms which may be used to advantage.

Where a plurality of fluid pressure motors are to be operated, it will be understood that each motor will have in association therewith one of the magazine breech mechanisms hereinbefore described. In such cases, it is desirable that any one of a plurality of such motors be operated from a remote point selectively at the option of the operator. A device for accomplishing such selective operation is illustrated in Figs. 9 and 10 of the drawings. In Fig. 9 is shown four Bowden wires, 80, 81, 82 and 83, each one of which leads to a breech mechanism associated with a fluid pressure motor. It is understood of course that the number may be greater or less than four as the circumstances may demand. The wires 80, 81, 82 and 83 have attached to the end of each a rod 84 which is adapted to slide in a fixed tubular bearing 85. Each of these rods has extending from the inner end thereof an inturned finger 86. The bearings 85 are circularly arranged so that the fingers 86 are extended radially toward the center of the circle at which is located an operating member 87 rotatably mounted on an instrument board 88 or in any other desired position. The operating member 87 is provided with a handle 89 at one end thereof, and at the other end thereof has a projection 90 which is adapted to engage any one of the fingers 86 for the purpose of establishing operating contact therewith. Associated with the member 87 is a pointer 91 which is adapted to sweep a dial 92 having means or designations 93 thereon to indicate the position of the several Bowden wires leading to their respective motors. Thus, for example, should it be desired to actuate motor No. 1, such actuation can be accomplished by turning the handle 87 until the pointer 91 points to the figure 1 on the dial 92. In this position, projection 90 will contact finger 86 which is a continuation of the Bowden wire 80. Rearward axial movement of the handle 90 will then exert a pull on the Bowden wire 80 and operate the rotary breech mechanism in the manner hereinabove described.

It has been found advantageous under certain conditions to provide fluid pressure means for operating the Bowden wire or other operating means connected with the magazine breech mechanism. A simple form of such fluid pressure means is illustrated in Fig. 11, wherein 24 indicates the rotary magazine breech mechanism which is to be operated. The Bowden wire or rod 100 in this case passes through a packing gland 101 and into a cylinder 102 which may be attached to the screw threaded end 103 of the strain rod 15. Rod 100 is attached to a piston adapted to reciprocate within the cylinder 102. The piston is composed of a metallic piston member 104 and a flexible cupped gasket or packing member 105. A spring 106, one end of which rests against the piston member 104 and the other end of which rests against a screw cap member 107, is normally adapted to urge the piston 104 to the front end of the cylinder 102.

A suitable length of tubing 108 is attached in communicating relation with the interior of the forward end of the piston 102 by means of a nipple arrangement 109. The other end of the tube 108 communicates with the interior of a second cylinder 110 in which is a piston 111. The piston 111 may be manually operated through an operating knob 112. A spring 113 normally urges the piston 111 to the rear of the cylinder 110. It will be understood from the description that when the cylinder 110 and the tubing 108 are filled with a substantially non-compressible liquid, operation of the knob 112 to move the piston 111 to the rear of the cylinder 110 will serve to force the liquid within the cylinder through the tube 108, into the front end of the cylinder 102, and thereby move the piston 104 within the cylinder 102 to the rear of the cylinder against the tension of the spring 106. This operation will actuate the rod 100 to operate the rotary breech mechanism in the manner hereinbefore described. Release of the knob 112 will permit the springs 106 and 113 to restore the operating elements to normal position.

In Fig. 12 of the drawings is shown a manner of mounting the cylinder 110 and its operating knob 112 whereby the same may be operated by foot pressure. In this figure, 113 represents the floor of a vehicle and 114 is a bracket extending therefrom upon which a pedal 115 is pivoted to 116. It will be evident that pressure upon the pedal 115 will serve to pivot the same about the axis 116 and thereby cause the knob 112 to be depressed by contact with the upper end of the pedal. Further operation of this form of the invention is similar to that described with respect to Fig. 11. It will be evident, of course, that further operating mechanism as hereinafter to be described may also employ the invention taught in Fig. 12 of the drawings.

It may be desirable for certain conditions of operation to provide means for operating the breech mechanism which employs the lubricating pressure of an engine lubricating system. Such pressure can be utilized in a system like that shown in Fig. 13 of the drawings wherein 120 is a closed container adapted to receive oil under pressure while the engine is in operation. Oil from the lubricating system of the engine is led through conduit 121 past the check valve 122, through the branch conduit 123, and into the pressure receptacle 120. The conduit 123 extends below the line 121 and terminates in a three-way valve 124. It will thus be understood that while the engine is in operation the three-way valve 124 will be turned to a position to close the lower end of conduit 123. Oil will therefore pass from the lubricating system through conduit 121 and into the pressure receptacle 120 where such oil is held under pressure, its return to the lubricating system through conduit 121 being inhibited by the check valve 122.

Thus, with oil under pressure in the receptacle 120, if it is desired to actuate the starting motor through operation of the breech mechanism, it will be only necessary to turn the valve 124 to establish communication between conduits 123 and 125. Oil under pressure will now flow from the pressure receptacle 120 through the conduit 123, the valve 124, the conduit 125, and into the front end of the breech operating cylinder 126. This pressure is effective to move the piston 127 rearwardly against the tension of the spring 128. The breech operating rod 129 which is connected to the piston 127 will thereby be operated to actuate the breech mechanism in the manner hereinbefore described. After an actuation of the breech mechanism, the valve 124 may be turned to a third position to establish communication between conduit 125 and 130, thereby permitting the oil in the cylinder 126 to be returned to the engine sump or other suitable catch basin with which the conduit 130 communicates.

It has been found that under conditions of severely low temperature, and when the lubricating oil has been permitted to stand in the pressure receptacle 120 without any substantial agitation, such oil may become too viscous for proper operation of the breech operating cylinder. To obviate such difficulties and to adapt the system for operation under the most rigorous climatic conditions, the system as illustrated in Fig. 14 of the drawings has been devised. This system is adapted to operate under the influence of pressure operating on a light non-freezing fluid which does not become substantially viscous under adverse climatic conditions.

In Fig. 14 is shown a closed pressure cylinder 131 in which is a free piston 132 normally supported in the upper end of the cylinder 131 by means of a spring 133. The upper end of the cylinder 131 is in communication with a hand pump 134 through the conduit 135. A pressure gauge 136 also communicates with the top of the cylinder 131. The bottom of the cylinder 131 communicates with a storage tank 137 through conduits 138 and 139. The operating fluid which is contained in the storage tank 137 may flow through a check valve 140, conduit 139, conduit 138, and into one end of the cylinder 131. During such flow of operating fluid the valve 141 is turned to a position which closes the end of the conduit 138 and therefore permits operating fluid to flow only to the cylinder 131. With operating fluid in the cylinder 131, suitable pressure may be exerted thereon by manipulating the pump 134 until the pressure gauge 136 indicates the desired pressure. With the operating fluid in cylinder 131, thus under an appropriate pressure, the three-way valve 141 may be turned to establish communication between the conduits 138 and 142, the latter conduit being in communication with one end of the operating cylinder 143. The cylinder 143 contains a piston 144 to one side of which is attached the breech mechanism operating rod 145 and against the other side of which bears a spring 146 which normally tends to move the piston 144 to the forward end of the cylinder. It will be evident from what has been said heretofore that reciprocation of the rod 145 will actuate the breech mechanism. When the valve 141 is turned to establish communication between the conduit 142 and the conduit 147, the pressure on the operating fluid in the conduit 142 and in the cylinder 143 is released and the spring 146 will then return the piston 144 to its normal position. Operating fluid is thereby forced out of the cylinder 143, through the conduit 142, through the valve 141, and through the conduit 147 and back into tank 137. It will be noted that the tank 137 may be appropriately vented as at 148. Furthermore, the air pressure in the cylinder 131 may be released through operation of a check valve 149 which is adjacent the pump 134 and which may be operated by the pump handle to exhaust the cylinder 131. Operating fluid will now again pass from the tank 137, through the check valve 140, through the conduits 139, 138 and into the pressure cylinder 131. It will be understood of course that the various pistons herein referred to are adequately sealed against the passage of fluid from one side thereof to the other. Furthermore, while the pump 134 has been described as an air pump, it is also evident that other air or gas pressures, such as carbon dioxide gas or similar suitable fluids, may be used for the purpose of establishing pressure in the cylinder 131.

Instead of using air or gas pressure to establish a pressure on the operating fluid, it may be found desirable in some cases to combine the teachings of the systems shown in Figs. 13 and 14 into a system illustrated in Fig. 15 wherein a light non-freezing low pour point fluid is used to operate the breech mechanism operating cylinder, but wherein oil pressure from the engine lubrication system is utilized to establish a pressure upon the light non-freezing operating fluid. In the embodiment of the invention is shown a pressure receptacle 150 which is transversely divided by a free sealing piston 151 which is normally urged to its lower position in contact with the operating fluid by means of a spring 152 which contacts the piston 151 at the other end. The piston 151 consequently divides the chamber 150 into a fluid containing compartment and into an air space compartment over the piston. Operating fluid is normally contained in a second pressure chamber 153 which is similar in construction to chamber 150 and in which a piston 154 is free to reciprocate and is urged to one end of the chamber by means of a spring 155. A conduit 150' interconnects the bottom of the chamber 150 with the top of the chamber 153. The bottom of the chamber 153 is in communication with oil pressure from the lubricating system of the engine through conduit 156, past ball check valve 157, and past manually manipulable valve 158. A return line to the engine sump or other suitable catch basin is provided at 159 between the bottom of the chamber 153 and such engine sump. The operating fluid end of the chamber 150 communicates with a three-way valve 160 by means of a conduit 161. When the valve 160 is turned to a position to establish communication between the chamber 150 and the breech mechanism operating cylinder 162 through the conduit 163, operating fluid will pass through these conduits into one end of the breech mechanism operating cylinder 162 to move the piston 164 therein rearward against the tension of the coil spring 165. Such movement of the piston 164 carries with it the breech mechanism operating rod 166. The cylinder 162 is exhausted through the line 163 when the three-way valve 160 is turned to a position establishing communication between the line 163 and the line 167. The line 167 leads into the storage tank 168 which is suitably vented at one point thereof as at 169. Operating fluid may drain from the storage tank 168 through the conduit 167 past the check valve 170 and into the lower end of the chamber 150 when the system is not under pressure.

When the engine with which this mechanism is associated is in operation, oil from the lubricating system will enter the chamber 153 through the line 156, thus forcing the piston 154 back against the pressure of the spring 155, and thereby force operating fluid through the line 150' and into the chamber 150, forcing the piston 151 upwardly and compressing the air above this piston. It will be observed that through this operation, the operating fluid will be held in the chamber 150 under adequate pressure. When it is desired, therefore, to actuate the breech mechanism, such operation can be accomplished by turning the valve 160 to establish communication between the conduits 161 and 163. Fluid under pressure passing through these conduits will operate the breech operating piston 164 as hereinabove described. Further movement of the valve 160 will serve to exhaust the cylinder 162, as hereinabove described. It will be noted that the oil under pressure is prevented from returning to the lubricating system through the conduit 156 by means of the ball check valve 157. On the other hand, the oil under pressure in the chamber 153 is prevented from returning to the engine sump or other catch besin by means of manually manipulable valve 171 which may be operated to permit the oil in the chamber 153 to return to the engine sump or other suitable place through the conduit 169.

This invention also contemplates electro-magnetic means for operating the breech mechanism and one embodiment of such means is illustrated in Fig. 16, wherein the breech mechanism is generally indicated by the numeral 24 and in which a breech operating rod 180 is shown as extending into a magnetic coil 181 to form the armature thereof. The coil 181 may be attached to the strain rod 15, as by screw threads 182. The coil 181 may be suitably grounded and may be placed in circuit with the battery 183 through switch 184. It will thus be evident that when the circuit is closed by manipulation of the switch 184, current passes from the battery 183 into the coil 181 and draws the armature-breech operating rod 180 rearwardly in a manner well understood by those skilled in the art.

It is important that the operator receive positive evidence that the breech mechanism has been effectively operated, and for this purpose there is disclosed in Figs. 17 and 18 means for indicating the successful operation of the breech mechanism. Attached to the strain rod 14 is a circuit maker, generally indicated at 190. The circuit maker 190 comprises a strip of conducting material 191 which encircles and is supported by the strain rod 14 and which is insulated therefrom by insulating member 192. After encircling the strain rod 14 the ends of the conducting strip 191 are extended in what may be termed a short leg 197 and a long leg 194, said legs being disposed in spaced parallel relationship with a block of insulating material 195 disposed therebetween. By means of a bolt 196 passing through the short leg 197, the insulating block 195 and the long leg 194, the parts may be securely clamped in assembled relation to the strain bar 14. The long leg 194 of the conducting strip 191 constitutes one of the two contact fingers of the circuit maker 190, while a conducting strip 193 secured to the opposite side of the insulating block 195 by means of screw 202 constitutes the other contact finger. The finger 193 is mounted on the insulating block in spaced relation from the short leg 197 of the conducting strip 191 and consequently out of electrical contact therewith. Normally spaced contact points 198 and 199 are carried by the fingers 193 and 194, respectively. The finger 193 is in circuit with a battery or other suitable source of electrical current 200 through the conductor 201 and screw 202. A signal lamp 203 which may be positioned on an instrument board is in electrical contact with the short leg 197 of the conducting strip 191 through the conductor 204. Since both the battery and lamp are suitably grounded it will be seen that when the contact points 198 and 199 are brought together the circuit will be established and the signal lamp 203 will be lighted.

It will be observed by reference to Fig. 17 that the circuit making mechanism is located slidably to the rear of the rotary breech plate 26 so that no portion of the breech mechanism is in operative contact with the signal mechanism when one of the cartridge chambers 25 is in firing position. However, when the breech block is operated as hereinabove described for the purpose of rotating the magazine, the magazine cartridge-chambers 25 are in regular order moved under the circuit making device 190 so that rotation of the magazine will bring the outer exterior surface of each cartridge-chamber 25 into contact with the finger 194 during the course of such rotation. When this contact occurs, the high portion of the periphery of each cartridge-chamber 25 will move the finger 194 and the contact point 199 into contact with the contact point 198 of finger 193, thereby establishing a circuit from the source of current 200 through the circuit making mechanism 190 and to the signal lamp 203. It will be understood, of course, that the operating contact between the exterior surface of each cartridge-chamber and the finger 194 is only momentary so that a flashing signal is given by the lamp 203 to indicate that the magazine of the breech mechanism has been rotated. Upon completion of the breech mechanism operation, the magazine again moves forward as hereinabove described and the cartridge-chamber which has just served to operate the signal mechanism moves away from the circuit making device 190 and is positioned in firing relation with the cylinder 11. It will be understood that the operation described will take place each time the breech mechanism is actuated so that a signal is given at each operation of the rotary magazine. The lamp 203 is simply representative of other signal means which may be of a visual, audible, or other suitable character.

It is also to be noted in connection with the systems disclosed in Figs. 11, 13, 14 and 15 that there is provided a multiple selector valve which is manually operated to select any one of a plurality of fluid pressure motors to be operated, a plurality of pressure and exhaust lines being controlled selectively by said valve, and each pressure and exhaust line leading from said valve to a different fluid pressure motor.

It will be understood that the invention herein taught may be embodied in different forms and the specific illustrations hereinabove given are merely for the purpose of teaching broad principles of the invention. It is therefore desired that the practice of the invention shall not be limited to these specific examples, but shall be limited only by the scope of the subjoined claims.

What I claim is:

1. A structure of the character described comprising a pressure cylinder, a rotatable magazine associated therewith adapted to receive a plurality of pressure generating charges, a breech block adapted to back up said charges as they are brought into alignment with said pressure cylinder, a latching means carried by said cylinder adapted to engage means on said magazine for effecting alignment between said cylinder and a charge carried by said magazine, spring means operative to rotate said magazine when released from said latching means, means under the control of an operator at a remote point for moving said magazine in a rearward direction away from said pressure cylinder for effecting release of said magazine from said latching means whereby said spring means may rotate said magazine for aligning an unfired charge, means for relatching said magazine, and a firing pin carried by said breech block in alignment with said pressure chamber and pressure generating charge therebetween, to ignite said charge.

2. A structure of the character described comprising a pressure cylinder, a rotatable magazine associated therewith adapted to receive a plurality of pressure generating charges, a breech block adapted to back up said charges as they are brought into alignment with said pressure cylinder, spring means for rotating said magazine, means for controlling said spring means for operating said magazine from a remote point, auxiliary means directly associated with said structure for manipulating said magazine for reloading the same, and a firing pin carried by said breech block in alignment with said pressure chamber and pressure generating charge therebetween, for igniting said charge.

3. A structure of the character described comprising a pressure cylinder, a rotatable magazine associated therewith adapted to receive a plurality of pressure generating charges, a breech block adapted to back up said charges as they are brought into alignment with said pressure cylinder, a latching means carried by said cylinder adapted to engage means on said magazine for effecting alignment between said cylinder and a charge carried by said magazine, spring means operative to rotate said magazine when released from said latching means, means operative from a remote point under control of an operator for effecting release of said magazine from said latching means to permit rotation of said magazine for the purposes intended, means directly associated with said structure for manipulating said magazine for reloading the same, and a firing pin carried by said breech block in alignment with said pressure chamber and pressure generating charge therebetween, for igniting said charge.

4. A structure of the character described comprising a pressure cylinder, a rotatable magazine having a plurality of pressure generating charge receiving chambers, a breech block adapted to back up said charges as they are brought into alignment with said pressure cylinder, latching means carried by said cylinder adapted to engage means on said magazine for effecting successive alignment between said cylinder and a charge chamber of said magazine upon successive operations thereof, spring means operative to rotate said magazine when released from said latching means, means under the control of an operator at a remote point for first moving the breech block in a rearward direction away from the magazine and then moving the magazine in a rearward direction sufficient to release said magazine from the latching means whereby said spring means becomes effective to rotate the magazine, a second spring means for returning the parts to normal firing relation with a new charge in position to be fired, and a firing pin carried by said breech block in alignment with said pressure chamber and pressure generating charge therebetween, to ignite said charge.

5. In a structure of the character described comprising a pressure cylinder, a rotatable magazine having a plurality of chambers for receiving pressure generating charges, a breech block adapted to back up said charges as they are brought into alignment with said pressure cylinder, and non-rotative means mounted on said magazine structure and engaging the rear end of each charge for preventing accidental displacement of said pressure generating charges from their receiving chambers in all operative positions of the magazine.

6. In a structure of the character described comprising a pressure cylinder, a rotatable magazine having a plurality of chambers for receiving pressure generating cartridges, a cartridge ejector rod mounted upon said rotatable magazine and in cooperative relation with a cartridge in a receiving chamber, a spring for maintaining said rod in inoperative position, and manual means adapted to engage within a recess in said magazine structure for moving said ejector rod against the tension of said spring to eject cartridges.

7. In a structure of the character described comprising a pressure cylinder, a cartridge receiving chamber associated with said cylinder, a breech block for backing up said cartridge receiving chamber, means for firing a cartridge contained within said chamber for generating pressure gases within the cylinder to perform a useful work operation, valve operating means for exhausting the pressure gases from the cylinder after each work operation, and means for operating said firing means and the exhaust valve operating means under the control of an operator at a remote point, said remote control means serving to initially operate the valve for exhausting the gases of a fired cartridge prior to the positioning of another cartridge in firing relation to the pressure cylinder.

8. In a structure of the character described comprising a pressure cylinder, a rotatable magazine having a plurality of chambers for receiving pressure generating charges, a breech block adapted to back up said charges as they are brought into alignment with said pressure cylinder, and fixed means mounted on said magazine structure serving to prevent accidental displacement of the pressure generating charges from their receiving chambers in all operative positions of the magazine, said means comprising a spider washer having radially extending fingers overlapping the rear end of each charge when in operative relation therewith.

9. In a structure of the character described comprising a pressure cylinder, a rotatable magazine having a plurality of chambers for receiving pressure generating charges, a breech block adapted to back up said charges as they are brought into alignment with said pressure cylinder, and means mounted on said magazine structure for preventing accidental displacement of the pressure generating charges from their receiving chambers in all operative positions of the magazine, said means provided with lugs cooperating with the breech block structure to hold said means in fixed relation therewith to properly function as a retaining means for the charges.

10. In a structure of the character described comprising a pressure cylinder, a rotatable magazine having a plurality of chambers for receiving pressure generating charges, a breech block adapted to back up said charges as they are brought into alignment with said pressure cylinder, and fixed means mounted on said magazine structure serving to prevent accidental displacement of the generating charges from their receiving chambers in all operative positions of the magazine, said means having projecting fingers overlapping the rear end of each charge when in operative relation therewith, and said fingers being of such dimension that the charges may be released therefrom when the magazine is moved with respect to said fixed means and its projecting fingers.

11. In a structure of the character described comprising a pressure cylinder, a rotatable magazine having a plurality of chambers arranged in series for receiving pressure generating cartridges, a cartridge ejector rod mounted between adjacent cartridge chambers with the ejector head of each rod lying beneath the rims of two adjacent cartridge shells when the cartridges are in place within their chambers, and means to move said ejector rods from their normal cooperative position upon said magazine for ejecting at one and the same time two cartridge shells, said ejector rods being so arranged upon the magazine structure and with respect to the cartridges that certain of said cartridges may be ejected by any one of two ejector rods.

ROSCOE A. COFFMAN.